(12) United States Patent
Girardeau, Jr. et al.

(10) Patent No.: US 7,610,017 B2
(45) Date of Patent: Oct. 27, 2009

(54) INCREASED DATA RATE TRANSMISSIONS OF A WIRELESS COMMUNICATION

(75) Inventors: James Ward Girardeau, Jr., Austin, TX (US); Christopher Alan Aardema, Austin, TX (US); Bradley Arthur Wallace, Austin, TX (US)

(73) Assignee: VIXS Systems, Inc., Toronto, Ontario (CA)

( * ) Notice: Subject to any disclaimer, the term of this patent is extended or adjusted under 35 U.S.C. 154(b) by 624 days.

(21) Appl. No.: 11/148,704

(22) Filed: Jun. 9, 2005

(65) Prior Publication Data

US 2006/0281487 A1 Dec. 14, 2006

(51) Int. Cl.
H04B 7/00 (2006.01)

(52) U.S. Cl. .......................... 455/59; 455/103; 455/132; 370/535; 370/536; 375/349

(58) Field of Classification Search ............. 455/533.1, 455/426.2, 425, 456.5, 456.6, 561, 550.1, 455/575.1, 463, 526, 102, 103, 132, 452.2, 455/403, 414.1, 17, 21, 61, 59; 370/474, 370/338, 394, 229, 335, 389, 535, 536, 540, 370/480, 481, 340, 341, 343, 346, 347, 208; 375/225, 221, 257, 260, 295, 263, 265, 349
See application file for complete search history.

(56) References Cited

U.S. PATENT DOCUMENTS

| | | | | |
|---|---|---|---|---|
| 5,371,734 | A * | 12/1994 | Fischer ....................... | 370/311 |
| 5,974,106 | A * | 10/1999 | Dupont et al. ............... | 375/377 |
| 6,786,623 | B2 * | 9/2004 | Snyder et al. ................ | 362/485 |
| 6,795,418 | B2 * | 9/2004 | Choi .......................... | 370/336 |
| 6,901,072 | B1 * | 5/2005 | Wong .......................... | 370/389 |
| 7,263,105 | B2 | 8/2007 | Trainin | |
| 7,286,557 | B2 * | 10/2007 | Feuerstraeter et al. ....... | 370/465 |
| 2004/0086027 | A1 | 5/2004 | Shattil | |
| 2004/0128605 | A1 * | 7/2004 | Sibecas et al. ............... | 714/746 |
| 2004/0198370 | A1 * | 10/2004 | Braun et al. ............. | 455/452.2 |
| 2005/0089009 | A1 * | 4/2005 | Raleigh et al. ............... | 370/349 |
| 2005/0100039 | A1 | 5/2005 | Husted et al. | |
| 2005/0141540 | A1 | 6/2005 | Li et al. | |
| 2005/0157687 | A1 * | 7/2005 | Heo et al. ..................... | 370/335 |
| 2005/0180312 | A1 | 8/2005 | Walton et al. | |

(Continued)

FOREIGN PATENT DOCUMENTS

WO  WO 2005 004429 A  1/2005

OTHER PUBLICATIONS

Texas Instruments, "WLAN Channel Bonding: Causing Greater Problems Than It Solves", Sep. 2003, pp. 1-13, XP002447539.

(Continued)

Primary Examiner—Duc Nguyen
Assistant Examiner—Charles Chow

(57) ABSTRACT

A method for receiving high data rate wireless communication transmissions begins by receiving a plurality of radio frequency (RF) signals in accordance with a wireless communication standardized data rate on a plurality of RF channels. The method continues by converting each of the plurality of RF signals into a plurality of signals. The method continues by processing the plurality of signals at baseband or near baseband into media access control (MAC) data, wherein a number of the plurality of signals corresponds to an integer multiple. The method continues by processing the MAC data at a combination of wireless communication standardized data rates to produce recovered data.

17 Claims, 10 Drawing Sheets

U.S. PATENT DOCUMENTS

| | | | |
|---|---|---|---|
| 2005/0186958 A1* | 8/2005 | Hansen et al. | 455/426.2 |
| 2006/0092825 A1* | 5/2006 | Kim et al. | 370/206 |
| 2006/0187964 A1* | 8/2006 | Li et al. | 370/474 |
| 2006/0212773 A1* | 9/2006 | Aytur et al. | 714/755 |
| 2007/0014269 A1* | 1/2007 | Sherman et al. | 370/338 |
| 2007/0030986 A1* | 2/2007 | McArthur et al. | 381/311 |
| 2007/0064708 A1* | 3/2007 | Usuda et al. | 370/394 |
| 2007/0081453 A1* | 4/2007 | Hsu et al. | 370/229 |
| 2007/0082633 A1* | 4/2007 | Carbone et al. | 455/166.2 |
| 2007/0291853 A1 | 12/2007 | Kim et al. | |
| 2008/0118011 A1* | 5/2008 | Trachewsky et al. | 375/343 |
| 2008/0159436 A1* | 7/2008 | Cho et al. | 375/299 |
| 2008/0170533 A1* | 7/2008 | Cyzs et al. | 370/315 |

OTHER PUBLICATIONS

Mujtaba S. A.: "TGn Sync Proposal Technical Specification", IEEE 802.11-04/0889R6, May 18, 2005, pp. 1-134, XP002347780.

Hansen and B Edwards C: "Wise Proposal: High throughput extension to the 802.11 Standard", Jan. 2005, pp. 1-100, XP002396346.

Mar. 2004 by Atheros Communications Inc., "Super G Maximizing Wireless Performance"; pp. 3-19.

* cited by examiner outbound BB processing module 68 interleaving module 82 outbound BB processing module 68

RF transmit module 64 inbound BB processing module 66 deinterleaving module 182 inbound BB processing module 66

RF receiver module 62

INCREASED DATA RATE TRANSMISSIONS OF A WIRELESS COMMUNICATION

BACKGROUND OF THE INVENTION

1. Technical Field of the Invention

This invention relates generally to wireless communication systems and more particularly to increased data rates in such systems.

2. Description of Related Art

Wireless communication systems are known to include a plurality of wireless communication devices that communicate over wireless communication channels, which are supported by wireless communication infrastructure equipment (e.g., base stations, access points, system controllers, wide area network interfaces, local area network interfaces, et cetera). Each wireless communication device, which may be a radio, cellular telephone, station coupled to a personal digital assistant, personal computer, laptop, et cetera, includes a radio transmitter and a radio receiver. The radio transmitter includes a baseband processor, one or more intermediate frequency stages, filters, and a power amplifier coupled to an antenna. The baseband processor encodes and/or modulates, in accordance with a wireless communication standard such as IEEE 802.11a, IEEE802.11b, Bluetooth, Global System for Mobile communications (GSM), Advanced Mobile Phone Service (AMPS), et cetera, to produce baseband signals. The one or more intermediate frequency stages mix the baseband signals with one or more local oscillations to produce a radio frequency signal. The filter filters the radio frequency signal to remove unwanted frequency components and the power amplifier amplifies the filtered radio frequency signal prior to transmission via the antenna.

A radio receiver is known to include a low noise amplifier, one or more intermediate frequency stages, filters and a receiver baseband processor. The low noise amplifier amplifies radio frequency (RF) signals received via an antenna and provides the amplified RF signals to the one or more intermediate frequency stages. The one or more intermediate frequency stages mixes the amplified RF signal with one or more local oscillations to produce a receive baseband signal. The receiver baseband processor, in accordance with a particular wireless communication standard, decodes and/or demodulates the baseband signals to recapture data therefrom.

One advantage of standardized wireless communications is that wireless communication devices can be manufactured by different manufacturers and still provide reliable service. However, a disadvantage of the standardized wireless communications is that channel usage, data rate, modulation schemes, etc. are dictated by the standard. Thus, a design choice is made to be standard compliant and operate within the parameters of the standard or operate at desired parameters and not be standard compliant. An issue with non-standard compliant operations is that if the frequency spectrum for the wireless communication is shared with a standard compliant communication system, interference will occur, resulting in degraded performance for both the standard compliant and non-compliant systems.

One approach to achieve data rates greater than standardized data rates for IEEE 802.11a is a Turbo mode developed by Atheros, as disclosed in an Atheros white paper, entitled Super G, Maximizing Wireless Performance, 3/2004. However, this method may create interference with standardized IEEE 802.11a communications.

Therefore, a need exists for a method and apparatus of achieving non-standard features while maintaining standard compatibility.

DETAILED DESCRIPTION OF THE INVENTION

Figure 1:
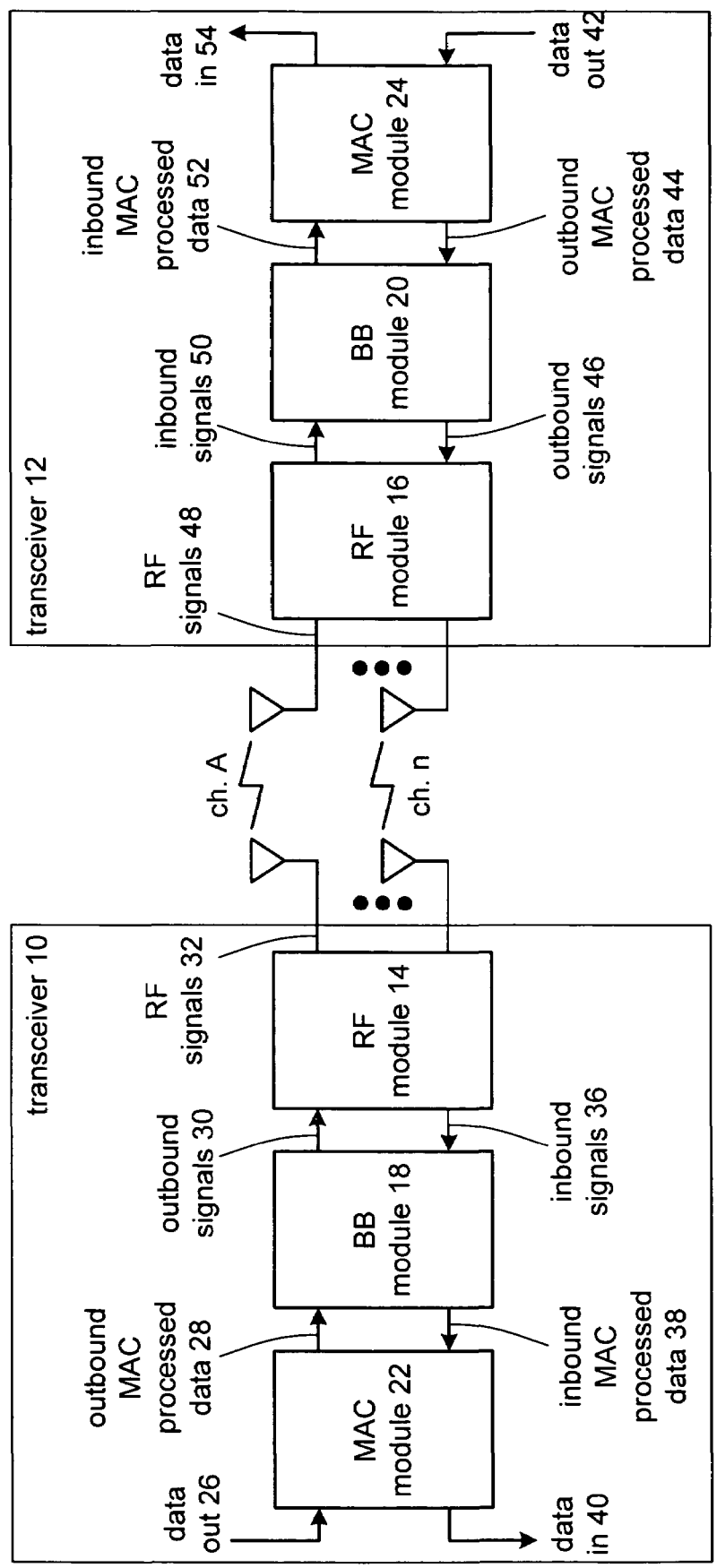
FIG. 1 is a schematic block diagram of transceivers in accordance with the present invention.

FIG. 1 is a schematic block diagram of transceivers 10 and 12 communicating via one or more of a plurality of wireless communication channels (CH. A-CH. n), which may be in a frequency spectrum allocated for standardized wireless communications such as IEEE 802.11a, b, g, Bluetooth, etc. For example, the transceivers 10 and 12 may be communicating via one channel (e.g., CH. A) in accordance with one or more wireless communication standards. As an alternate example, the transceivers may be communicating via two channels (e.g., CH. A & CH. B), or more. In this example, since the channels are in the frequency spectrum of standardized wireless communications, the transceivers 10 and 12 process the multiple channel wireless communication such that standard compliant transceivers within range of transceivers 10 and 12 can recognize the wireless communication and avoid an interfering transmission by waiting for the wireless communication to end.

To facilitate the one or more channel communications, each of the transceivers 10 and 12 includes a MAC (Medium Access Control) module 22, 24, a BB (baseband) module 18, 20, and an RF (radio frequency) module 14, 16 operably coupled to multiple antennas. For a single channel communication, the MAC module 22, 24, the BB module 18, 20, and the RF module 14, 16 function in accordance with a standardized wireless communication protocol (e.g., IEEE 802.11a, b, g, Bluetooth, etc.).

For two or more channel communications, the MAC modules 22 and 24 function in accordance with a standardized wireless communication protocol, but may operate at a higher clock rate and/or at a higher utilization rate (e.g., less wait periods) to produce a combined data rate, which is greater than one of the standardized data rates. For example, assume that the data rate for a standardized wireless communication is D and the number of channels is N. From these assumptions, the data rate for the MAC modules 20 and 24 equals D*N. Accordingly, for a single channel communication, N equals one, thus the data rate for the MAC modules 22 and 24 equals 1*D. Similarly, for a two channel communication, N equals 2, thus the data rate for the MAC modules 22 and 24 equals 2*D. As a further example, assume that the data rate for a standardized wireless communication is D1, D2, D3, etc. and the number of channels is 2. In this example, the first channel may operate at a data rate corresponding to D1 (e.g., 6 Mbps) and the second channel may operate at a data rate corresponding to D2 (e.g., 18 Mbps). Accordingly, MAC modules 20 and/or 24 operate at the aggregate of the two channels (D1+D2) (e.g., 6+12=18 Mbps).

As shown, the MAC module 22, 24 receives outbound data (data out) 26, 42 at a data rate corresponding to the number of channels being used (i.e., the data rate equals N*D, where D is a standardized data rate, or the aggregate of the data rates of the channels, when the data rate of the channels are not equal). The MAC module 22, 24 processes the outbound data 26 in accordance with a standardized wireless communication protocol to produce outbound MAC processed data 28, 44. The outbound MAC processed data 28, 44 will be at a data rate corresponding to N*D, or $D_i+D_{i+1}, + \ldots$ (where $D_i$ is the data rate of one channel and $D_{i+1}$ is the data rate of another channel).

The BB module 18, 20, which will be described in greater detail with reference to FIGS. 3-5, receives the outbound MAC processed data 28, 44 at the data rate of N*D, or the aggregate data rate, and produces therefrom outbound signals 30, 46. In one embodiment, the BB module 18, 20 includes a 1-to-N data stream divider to produce N streams of data from the outbound MAC processed data 28, 44. In addition, the BB module 18, 20 includes N number of standardized baseband processing modules to perform at least one of scrambling, convolutional encoding, interleaving, bit mapping, inverse fast Fourier transform (IFFT), symbol shaping, and modulation (e.g., Quadrature Phase Shift Keying, Quadrature Amplitude Modulation, etc.).

The RF module 14, 16, which will be described in greater detail with reference to FIG. 6, receives the outbound signals 30, 46 and produces, therefrom, outbound RF signals 32, 46. For a single channel communication, the RF module 14, 16 transmits the RF signals 32, 46 on a single channel via an antenna structure (e.g., a single antenna, a diversity antenna structure). For a multiple channel communication, the RF module 14, 16 transmits the RF signals 32, 46 via multiple channels using multiple antennas. Accordingly, in an embodiment, the RF modules 14 and 16 include N standardized RF transmitters.

For inbound RF signals 32, 46 the RF modules 14, 16, which will be described in greater detail with reference to FIG. 10, receives the inbound RF signals 32, 46 and produces, therefrom, inbound signals 36, 50. For a single channel communication, the RF module 14, 16 receives the RF signals 32, 46 on a single channel via an antenna structure (e.g., a single antenna, a diversity antenna structure). For a multiple channel communication, the RF module 14, 16 receives the RF signals 32, 46 via multiple channels using multiple antennas. Accordingly, in an embodiment, the RF modules 14 and 16 include N standardized RF receivers.

The BB module 18, 20, which will be described in greater detail with reference to FIGS. 7-9, receives the inbound signals 36, 50 and produces, therefrom inbound MAC processed data 38, 52 at the data rate of N*D, or the aggregate data rate. In one embodiment, the BB module 18, 20 includes N number of standardized baseband processing modules to perform at least one of descrambling, decoding, de-interleaving, bit mapping, fast Fourier transform (FFT), and demodulation. In addition, the BB module 18, 20 includes an N-to-1 data stream combining module to produce the inbound MAC processed data 38, 52 from the N streams of data from the N standardized baseband processing modules.

The MAC module 22, 24 receives the inbound MAC processed data 38, 52 and produces therefrom inbound data (data in) 40, 54 at a data rate corresponding to the number of channels being used (i.e., the data rate equals the aggregate data rate or N*D, where D is a standardized data rate and N is the number of channels). The MAC module 22, 24 processes the inbound MAC processed data 38, 52 in accordance with a standardized wireless communication protocol to produce inbound data 40, 54, but at a rate corresponding to N*D.

Figure 2:
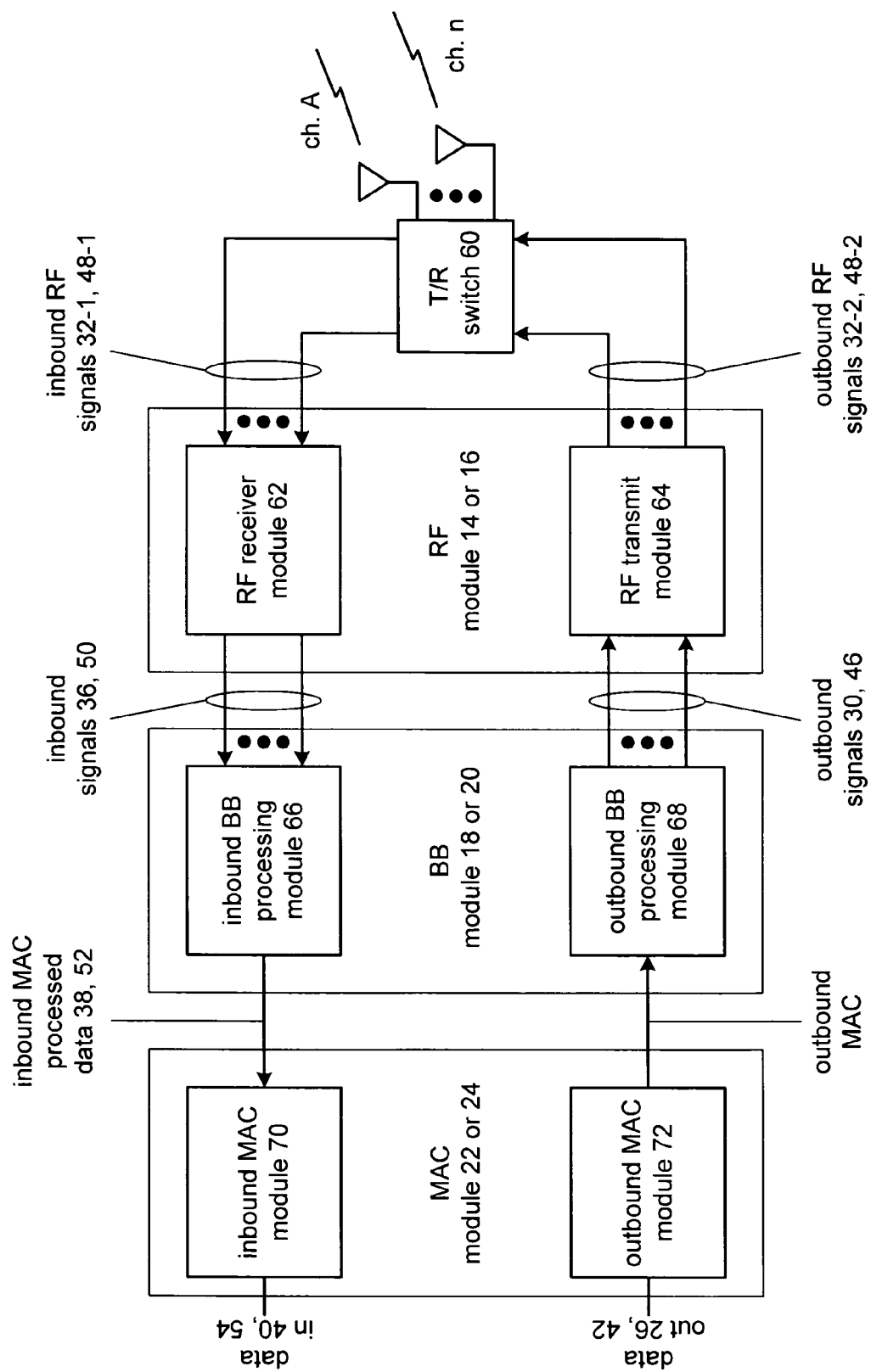
FIG. 2 is a schematic block diagram of a transceiver in accordance with the present invention.

FIG. 2 is a schematic block diagram of a transceiver 10 or 12 that includes the MAC module 22 or 24, the BB module 18 or 20, and the RF module 14 or 16. The transceiver 10 or 12 is also shown to include a transmit/receive (T/R) switch 60, which will be included when the transmit and receive paths share an antenna structure, but would be omitted if the transmit and receive paths include separate antenna structures. The MAC module 22 or 24 includes an inbound MAC module 70 and an outbound MAC module 72. The BB module 18 or 20 includes an inbound BB processing module 66 and an outbound BB processing module 68. The RF module 14 or 16 includes an RF receiver module 62, and an RF transmit module 64.

In operation, the outbound MAC module 72 converts outbound data 26, 42 into outbound MAC processed data 28, 44 in accordance with a standardized wireless communication protocol, but at an increased data rate (e.g., N*D or an aggregate data rate). The outbound BB processing module 68 converts the outbound MAC processed data 28, 44 include outbound signals 30, 46. In one embodiment, the outbound BB processing module 68 includes a 1-to-N data stream divider to produce N streams of data from the outbound MAC processed data 28, 44. In addition, the outbound BB processing module 68 includes N number of standardized baseband processing modules to perform at least one of scrambling, convolutional encoding, interleaving, bit mapping, inverse fast Fourier transform (IFFT), symbol shaping, and modulation (e.g., Quadrature Phase Shift Keying, Quadrature Amplitude Modulation, etc.).

The RF transmit module 64 converts the outbound signals 30, 46 into outbound RF signals 32-2, 48-2. The outbound RF signals 32-2, 48-2 will include one or more RF signals depending on the number of channels in the wireless communication. For example, for a single channel communication, the outbound RF signals 32-2, 48-2 include a single RF signal stream and for a two channel communication, the outbound RF signals include two RF signal streams. If included, the T/R switch 60 provides the outbound RF signals 32-2, 48-2 to the antennas for transmission.

In a receive mode, if included, the T/R switch 60 provides inbound RF signals 32-1, 48-1 from the antennas to the RF receiver module 62. The inbound RF signals 32-1, 48-1 will include one or more RF signals depending on the number of channels in the wireless communication. For example, for a single channel communication, the inbound RF signals 32-1, 48-1 include a single RF signal stream and for a two channel communication, the inbound RF signals include two RF signal streams.

The RF receiver module 62 converts the inbound RF signals 32-1, 48-1 into inbound signals 36, 50. The inbound signals 36, 50 will include N streams of signals, where N corresponds to the number of channels of the wireless communication. The inbound BB processing module 66 converts the inbound signals 36, 50 into an inbound MAC processed data 38, 52. In one embodiment, the inbound BB processing module 66 includes N number of standardized baseband processing modules to perform at least one of descrambling, decoding, de-interleaving, bit mapping, fast Fourier transform (FFT), and demodulation. In addition, the inbound BB processing module 66 includes an N-to-1 data stream combining module to produce the inbound MAC processed data 38, 52 from the N streams of data from the N standardized baseband processing modules.

The inbound MAC module 70 receives the inbound MAC processed data 38, 52 and produces therefrom inbound data (data in) 40, 54 at a data rate corresponding to the number of channels being used (i.e., the data rate equals the aggregate data rata or N*D, where D is a standardized data rate for each channel and N is the number of channels). The inbound MAC module 70 processes the inbound MAC processed data 38, 52 in accordance with a standardized wireless communication protocol to produce inbound data 40, 54, but at a rate corresponding to N*D, or the aggregate data rate.

Figure 3:
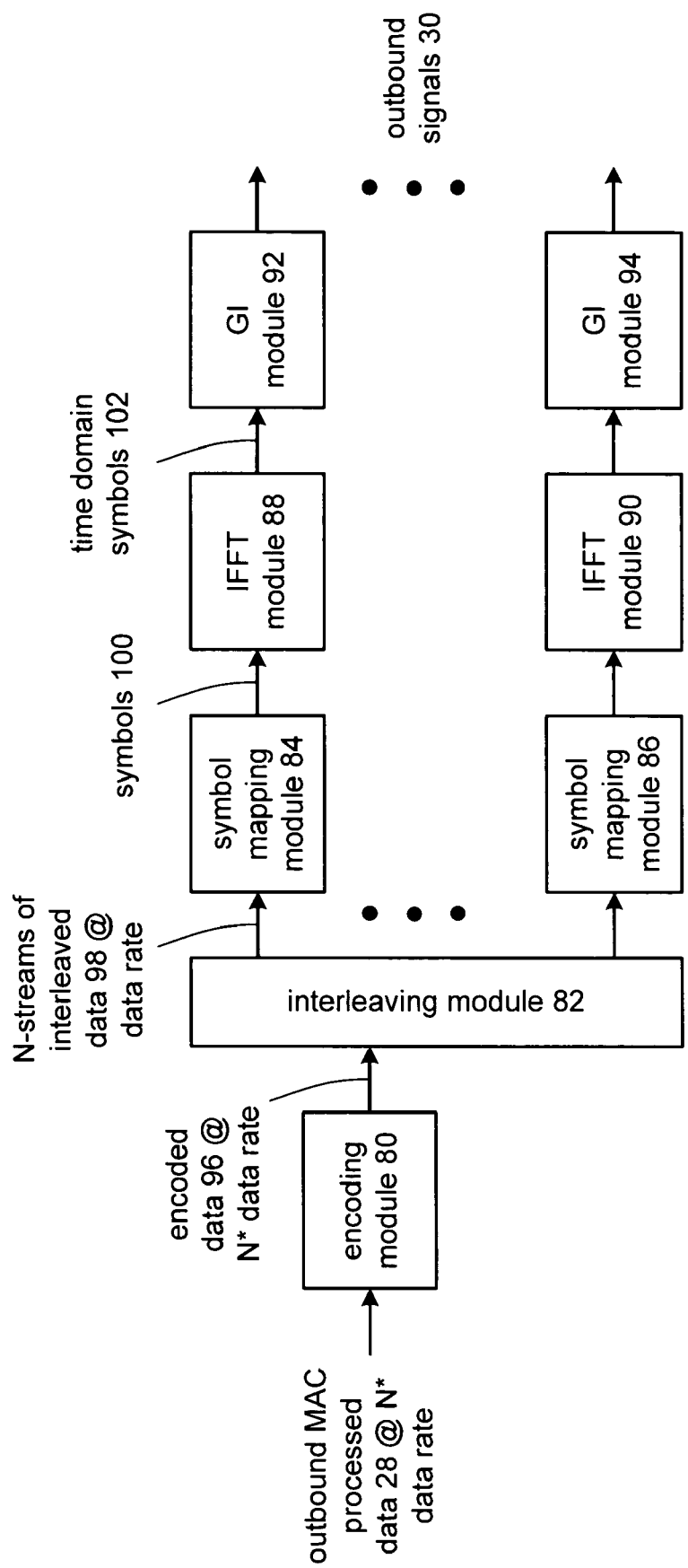
FIG. 3 is a schematic block diagram of an outbound baseband processing module in accordance with the present invention.

FIG. 3 is a schematic block diagram of an embodiment of the outbound baseband processing module 68 that includes an encoding module 80, an interleaving module 82, and a plurality of baseband processing streams. Each of the plurality of baseband processing streams includes a symbol mapping module 84, 86, an inverse fast Fourier transform (IFFT) module 88, 90, and a guard interval (GI) module 92, 94.

In operation, the encoding module 80 receives the outbound MAC processed data 28 at a N*D data rate, or aggregate data rate, and produces therefrom encoded data 96 at the N*D, or the aggregate, data rate. In one embodiment, the encoding module 80 functions in accordance with a standardized wireless communication protocol, but at a higher data rate (e.g., a higher clock rate and/or higher utilization rate), to produce the encoded data 96. For example, the encoding module 80 may be performing a convolutional encoding function in accordance with IEEE 802.11 a, b, or g.

The interleaving module 80, which will be described in greater detail with reference to FIG. 4, converts the encoded data 96 at the N*D, or aggregate, data rate into N streams of interleaved data 98 at a standardized data rate (D) of each of the channels. Each of the streams of interleaved data is processed by a symbol mapping module 84, 86, an IFFT module 88, 90, and a GI module 92, 94 to produce symbols 100, time domain symbols 102, and outbound signals 30, respectively. In one embodiment, the symbol mapping module 84, 86, the IFFT module 88, 90, and the GI module 92, 94 function in accordance with a standardized wireless communication protocol. Since each stream of data is processed in accordance with a standardized wireless communication protocol, standard compliant wireless communication devices will recognize these signals and thus wait for the RF channels to become available before transmitting, thereby avoiding interference.

Figure 4:
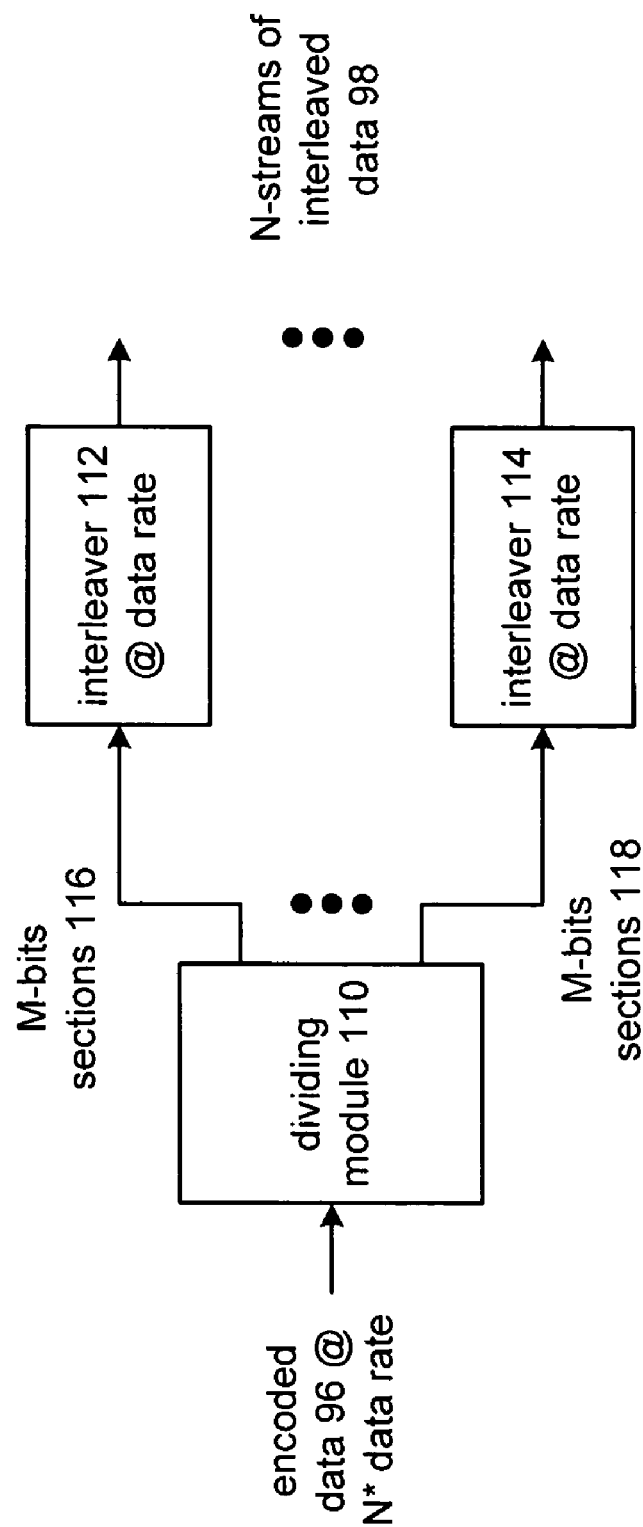
FIG. 4 is a schematic block diagram of an interleaving module in accordance with the present invention.

FIG. 4 is a schematic block diagram of an interleaving module 82 that includes a dividing module 110 and a plurality of interleavers 112, 114. The dividing module 110, which may be a multiplexer, receives the encoded data 96 at the N*D, or aggregate, data rate and produces therefrom M-bit sections 116, 118, where M may be 4 or multiples thereof. The interleavers 112, 114, which operate at the standardized data rate (D) of the corresponding channel, interleaves the corresponding M-bits sections 116, 118 to produce the N-streams of interleaved data 98. In one embodiment, the interleavers 112, 114 function in accordance with a standardized wireless communication protocol.

Figure 5:
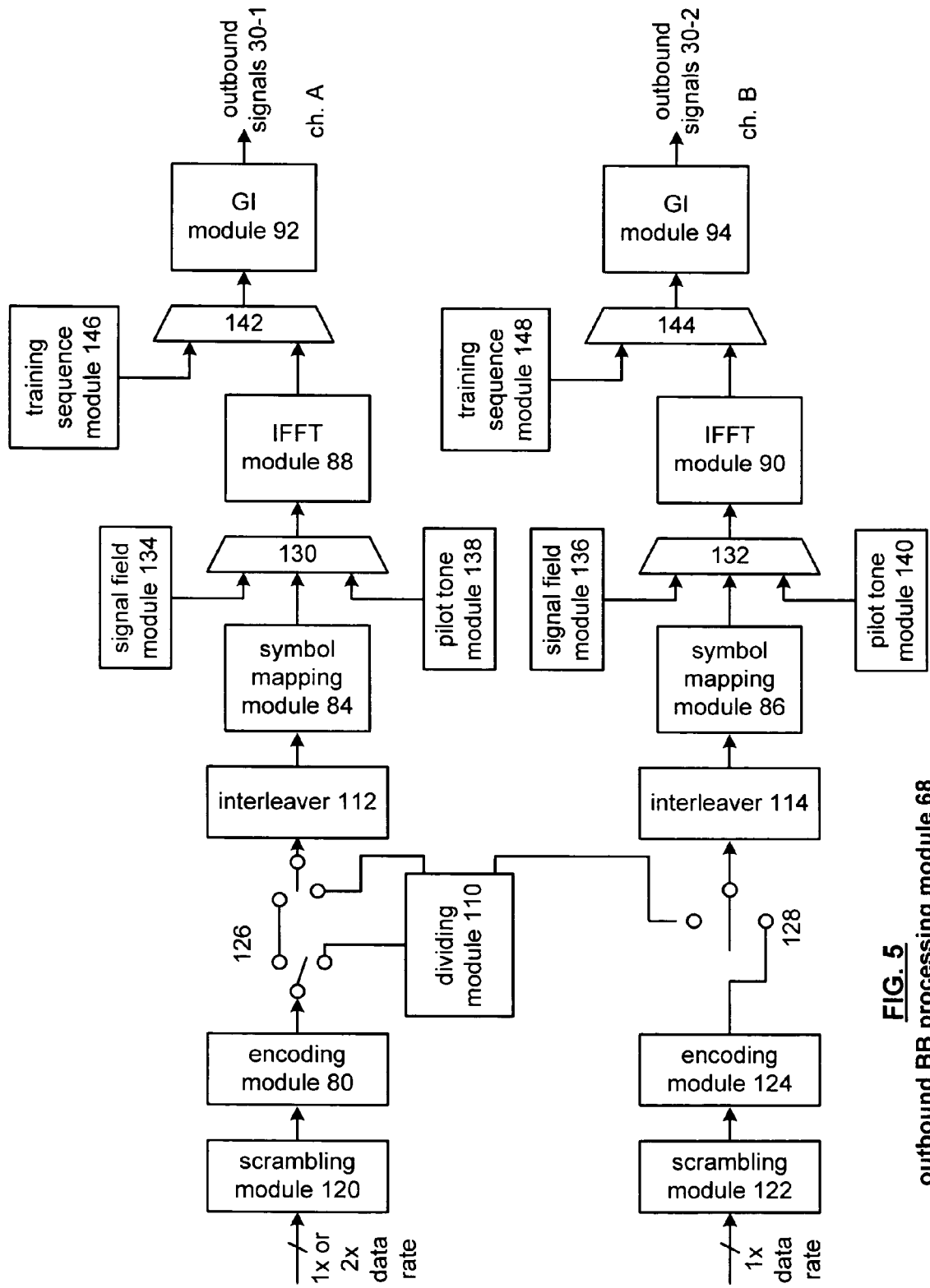
FIG. 5 is a schematic block diagram of an outbound baseband processing module in accordance with the present invention.

FIG. 5 is a schematic block diagram of an embodiment of the outbound baseband processing module 68 configurable for a standardized data rate transmission or a 2× standardized data rate transmission. In this embodiment, the outbound BB processing module 68 includes scrambling modules 120, 122, encoding modules 80, 124, switches 126, 128, the dividing module 110, interleavers 112, 114, the symbol mapping modules 84, 86, multiplexers 130, 132, 142, 144, signal field modules 134, 136, pilot tone modules 138, 140, IFFT modules 88, 90, training sequence modules 146, 148, and GI modules 92, 94.

For a single channel transmission on channel A and/or channel B, the dividing module 110 is inactive and the switches 126 and 128 are configured to provide the output of the encoding modules 80 and 124 to the corresponding interleavers 112 and 114. As configured, the outbound BB processing module 68 will function in accordance with a standardized wireless communication to produce the outbound signals 30-1 and/or 30-2. As is known, wireless communication standards prescribe that data is to be transmitted in frames that include a preamble section and a data section. To produce the preamble section of the frame, the multiplexers 130, 132, 142, and 144 are controlled to produce a signal field, a pilot tone, and a training sequence for the preamble of the frame. The signal field, while in accordance with a standardized format, will include a frame length, and/or data size, corresponding to the frame on a particular channel as opposed to the entire transmission of data. For the data section of the frame, multiplexers 130 and 132 are controlled to couple the symbol mapping module to the IFFT module and multiplexers 142 and 144 are controlled to couple the IFFT module to the GI module.

For a two channel transmission on both channels A and B, the dividing module is enabled, switch 126 is configured to provide the encoded data from the encoding module to the dividing module and to provide an M-bit section from the dividing module 110 to the interleaver 112, and switch 128 is configured to provide an M-bit section from the dividing module 110 to the interleaving 114. In this mode, scrambling module 122 and encoding module 124 are inactive and scrambling module 120 and encoding module 80 are operating at 2× the standardized data rate (D). To produce frames on each of channels A and B, the multiplexers are enabled to produce the preamble section and the data section as previously described.

Figure 6:
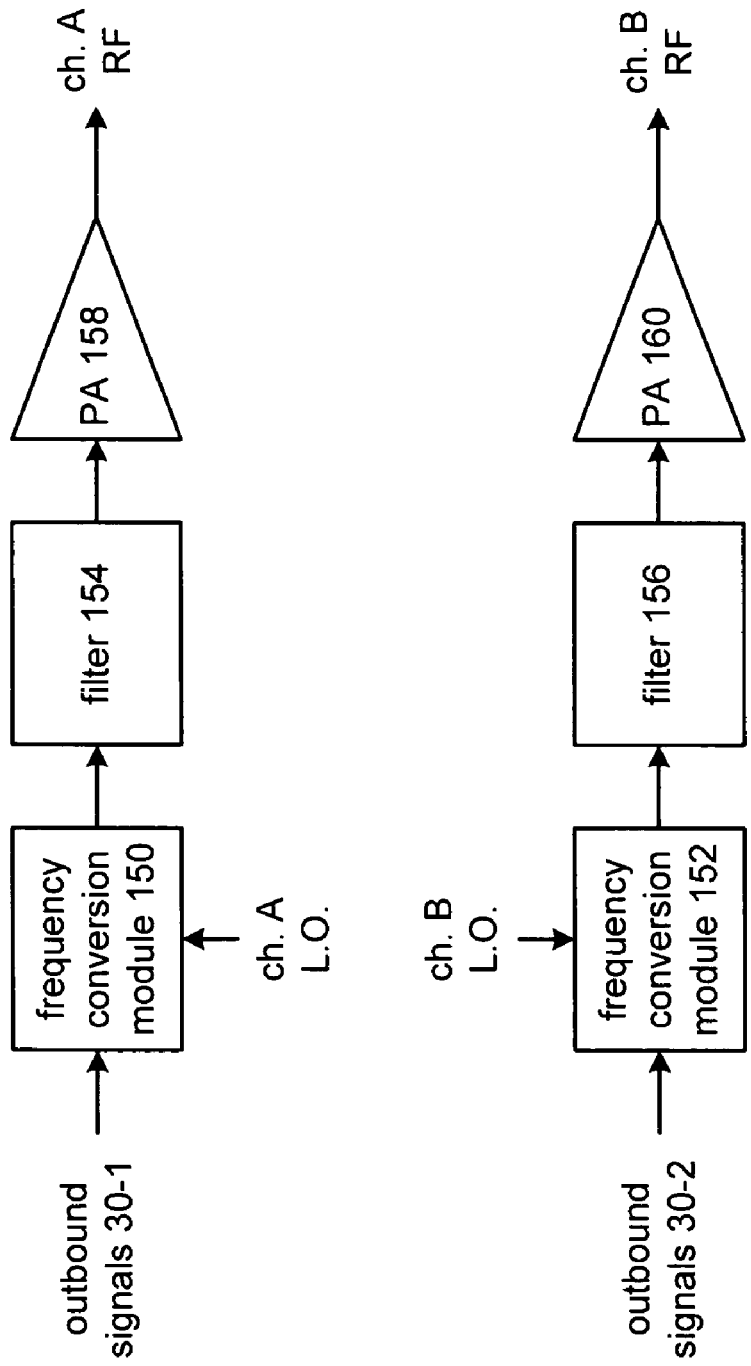
FIG. 6 is a schematic block diagram of a radio frequency transmit module in accordance with the present invention.

FIG. 6 is a schematic block diagram of a radio frequency transmit module 64 that includes a plurality of RF transmission paths. Each RF transmission path includes a frequency conversion module 150, 152, a filter 154, 156, and a power amplifier (PA) 158, 160. In operation, each of the frequency conversion modules 150, 152 receives outbound signals 30-1, 30-2 and mixes them with a local oscillation corresponding to the carrier frequency of one of the channels. For instance, frequency conversion module 150 mixes the outbound signals 30-1 with a local oscillation corresponding to channel A. As one of average skill in the art will appreciate, the frequency conversion modules 150, 152 may include a direct conversion configuration or a super heterodyne configuration.

The filters 154, 156 are bandpass filters having a bandpass region corresponding to the respective channel that filter the outputs of the frequency conversion modules 150, 152. The power amplifiers 158, 160 amplify the filtered signals to produce the outbound RF signals for both channel A and B.

Figure 7:
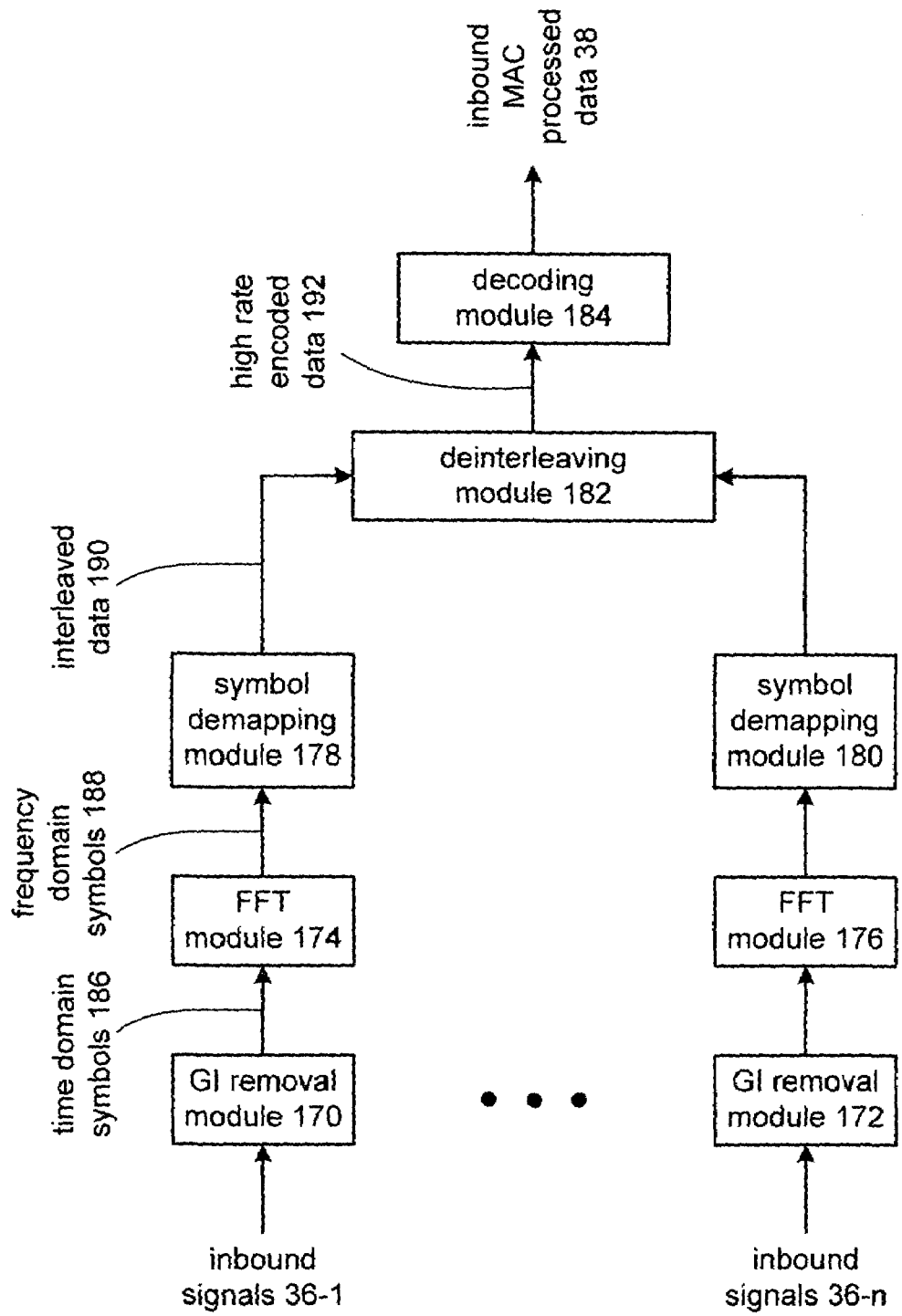
FIG. 7 is a schematic block diagram of an inbound baseband processing module in accordance with the present invention.

FIG. 7 is a schematic block diagram of an inbound baseband processing module 66 that includes GI (guard interval) removal modules 170, 172, FFT (fast Fourier transform) modules 174, symbol demapping modules 178, 180, deinterleaving module 182, and a decoding module 184. The GI removal modules, FFT modules, and symbol demapping modules function in accordance with a standardized wireless communication protocol to produce time domain symbols 186, frequency domain symbols 188, and interleaved data 190, respectively, from the inbound signals 36-1, 36-2. The inbound signals 36-1 and 36-2 are at a standardized data rate (D), which may be the same standardized data rate or different standardized data rates.

The deinterleaving module 182, which will be described in greater detail with reference to FIG. 8, receives the streams of interleaved data 190 and produces therefrom high rate encoded data 192. The high rate encoded data 192 is at a data rate of N*D, or the aggregate data rate. The decoding module 184 decodes the high rate encoded data 192 to produce the inbound MAC processed data 30. In an embodiment, the decoding module functions in accordance with a wireless communication protocol, but at a faster rate. As one of ordinary skill in the art will appreciate, the standardized data rate D may be one of many specified data rates ranging from 6 Mbps to 54 Mbps (Mega-bits per second) and may differ from one channel to the next.

Figure 8:
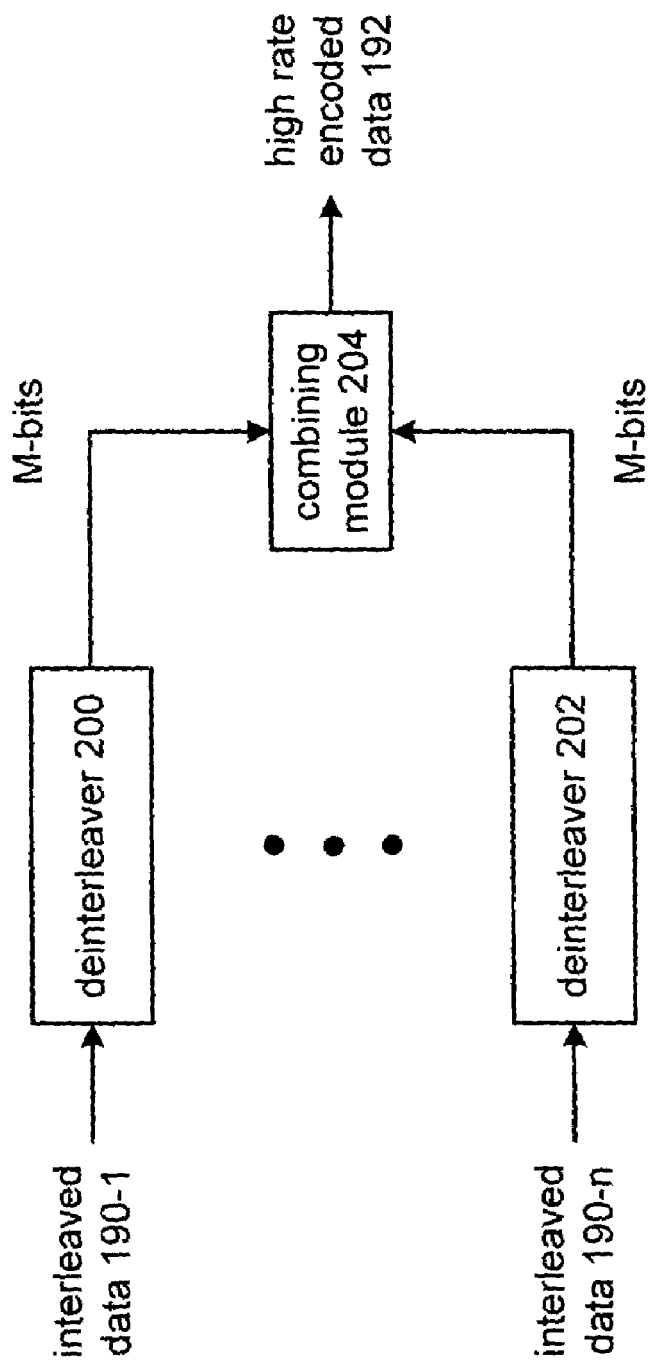
FIG. 8 is a schematic block diagram of a deinterleaving module in accordance with the present invention.

FIG. 8 is a schematic block diagram of a deinterleaving module 182 that includes a plurality of deinterleavers 200, 202 and a combining module 204. Each of the deinterleavers 200, 202, which functions in accordance with a standardized wireless communication protocol, receives a stream of the interleaved data 190-1, 190-2 at a standardized data rate (D) and produces therefrom, M-bit sections. The combining module 204, which may be an N-to-1 multiplexer, combines the M-bit sections into the high rate encoded data 192.

Figure 9:
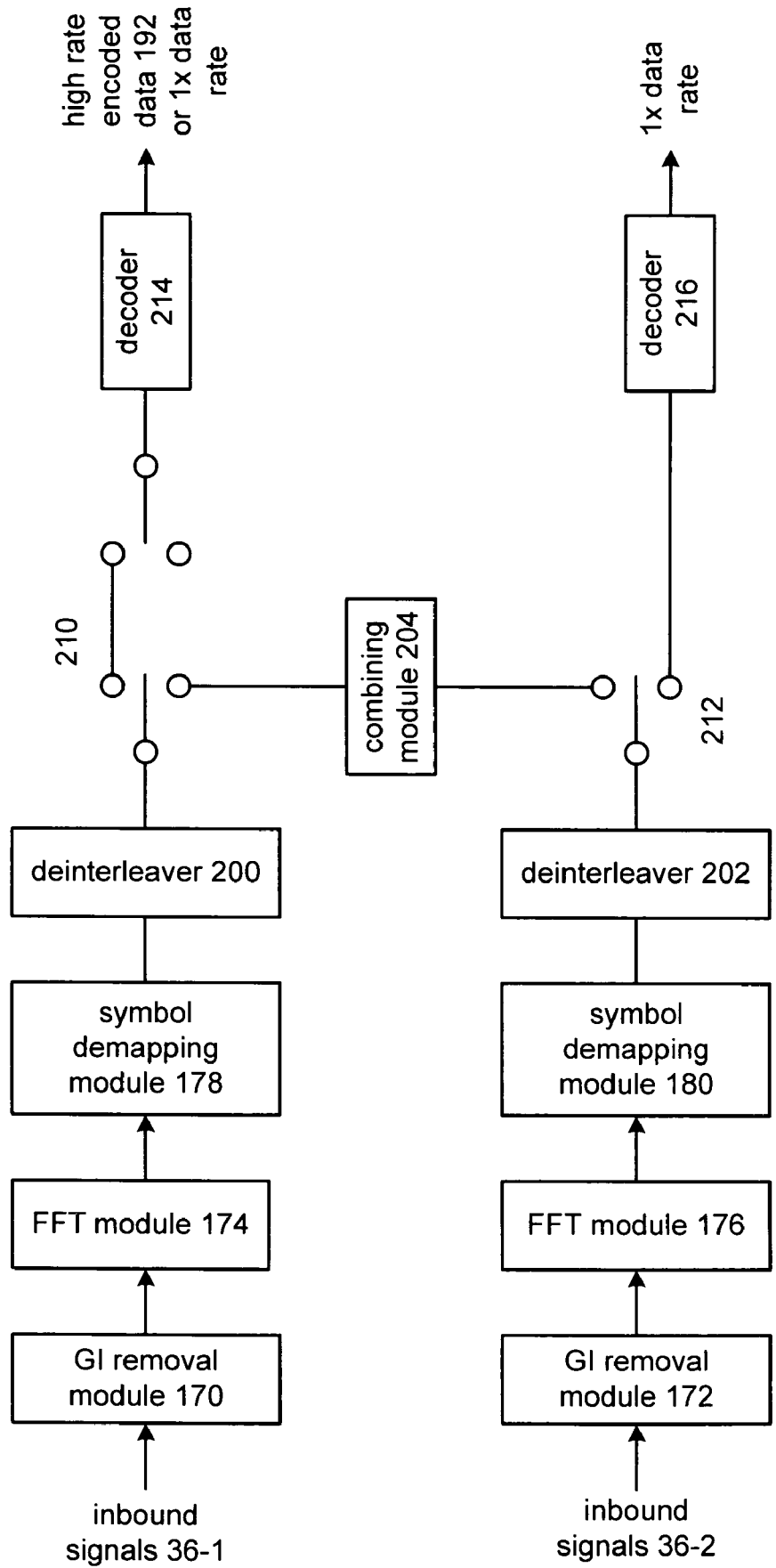
FIG. 9 is a schematic block diagram of an inbound baseband processing module in accordance with the present invention.

FIG. 9 is a schematic block diagram of an embodiment of the inbound baseband processing module 66 that includes the GI modules 170, 172, the FFT modules, 174, 176, the symbol demapping modules 178, 180, the deinterleavers 200, 202, a combining module 204, switches 210, 212, and decoders 214, 216. In this embodiment, the inbound baseband processing module 66 may process a single channel communication on channel A and/or B or a dual channel communication on both channels A and B.

For a single channel communication, the switches 210 and 212 are configured to couple deinterleaver 200 to decoder 214 and to couple deinterleaving 202 to decoder 216, respectively. In this instance, the inbound BB processing module 66 may process a single channel communication on channel A and/or B in accordance with a standardized wireless communication protocol.

For a dual channel communication, the switch 212 is configured to provide the output of deinterleaver 202 to the combining module 204 and switch 210 is configured to provide the output of deinterleaver 200 to the combining module 204 and to provide the output of the combing module 204 to decoder 214. In this instance, decoder 216 is inactive. With this configuration, the modules function as previously described with reference to FIG. 8.

Figure 10:
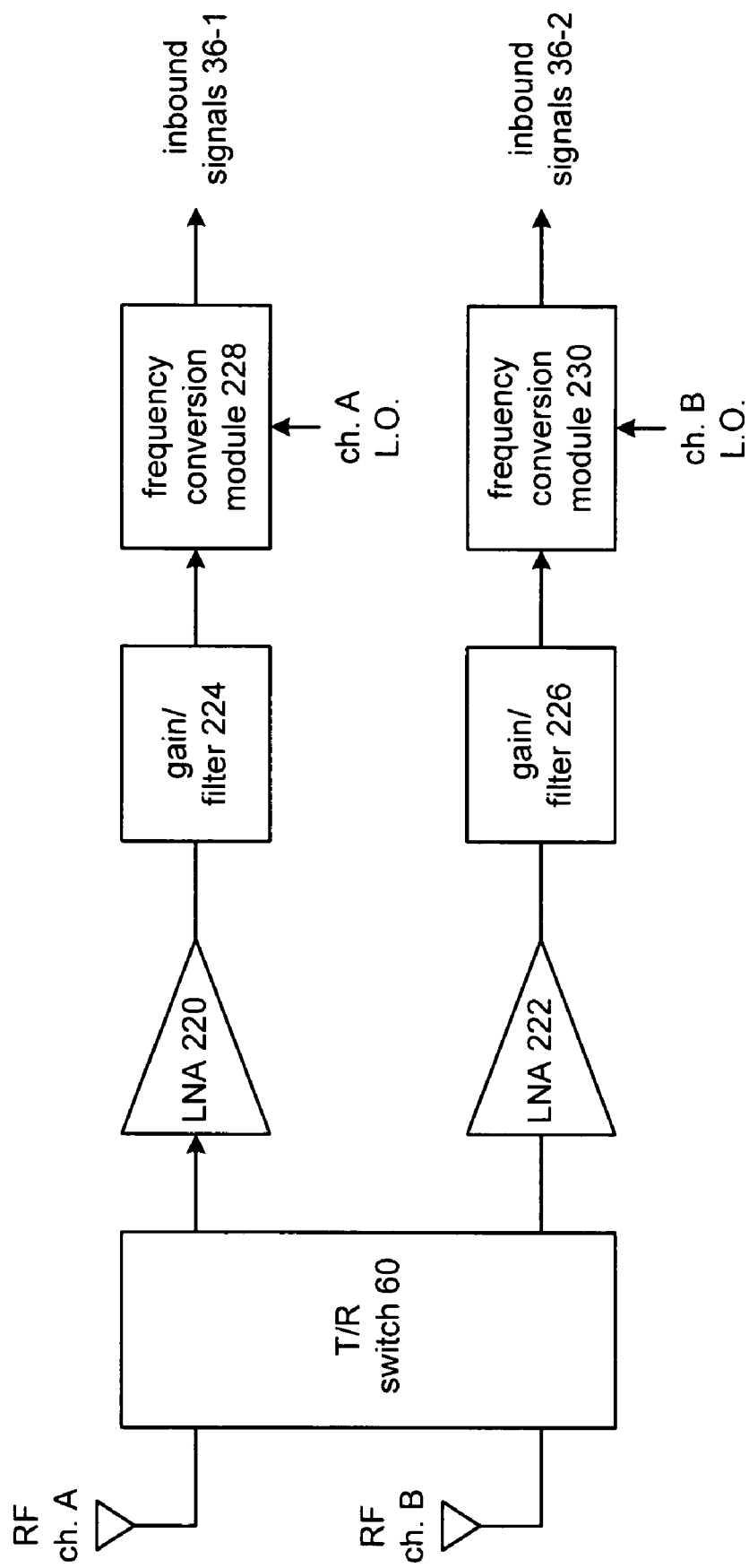
FIG. 10 is a schematic block diagram of a radio frequency receiver module in accordance with the present invention.

FIG. 10 is a schematic block diagram of a radio frequency receiver module 62 that includes the T/R switch 60, low noise amplifiers (LNA) 220, 222, gain/filter modules 224, 226, and frequency conversion modules 228, 230. Regardless of whether the transceiver is configured for single or multiple channel communications, the T/R switch 60 provides the inbound RF signals of channel A to LNA 220 and inbound RF signals on channel B to LNA 222. Each of the LNAs 220 and 222 amplify the inbound RF signals, which are subsequently filtered and further amplified by the gain/filter modules 224, 226.

The frequency conversion modules 228, 230 mix the outputs of the gain/filter modules 224, 226 with a local oscillation for channel A and for channel B, respectively, to produce the inbound signals 36-1 and 36-2. As one of average skill in the art will appreciate, the frequency conversion modules 150, 152 may include a direct conversion configuration or a super heterodyne configuration.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal I is greater than that of signal 2 or when the magnitude of signal 2 is less than that of signal 1.

The preceding discussion has presented a method and apparatus for increased data rate transmission of a wireless communication while substantially eliminating interference with standardized wireless communications. As one of ordinary skill in the art will appreciate, other embodiments may be derived from the teachings of the present invention without deviating from the scope of the claims.

What is claimed is:

1. A method for increasing data rate transmissions of a wireless communication, the method comprises:

processing data at a media access control (MAC) level at a combination of a wireless communication standardized data rates to produce MAC processed data;

encoding the MAC processed data at a rate corresponding to the combination of the wireless communication standardized data rates to produce high rate encoded data;

dividing, at M-bits per division, the high rate encoded data into a plurality of encoded data streams, wherein a number of the plurality of encoded data streams is N, wherein N is an integer greater than one and M is an integer greater than or equal to one; and individually interleaving each of the plurality of encoded data streams to produce N streams of interleaved data;

processing each of the N streams of interleaved data into a plurality of signals at baseband or near baseband, wherein a number of the plurality of signals is N;

converting each of the plurality of signals into a plurality of radio frequency (RF) signals; and transmitting the plurality of RF signals in accordance with the wireless communication standardized data rate on a plurality of RF channels.

2. The method of claim 1, wherein processing each of the plurality of encoded data comprises:

for each of the N streams of interleaved data:

symbol mapping sections of a stream of the N streams of interleaved data to produce symbols;

performing an inverse fast Fourier transform (IFFT) on the symbols to produce time domain symbols; and inserting guard intervals between the time domain symbols to produce the plurality of signals.

3. The method of claim 2, wherein processing each of the plurality of encoded data comprises:

inserting a training sequence compliant with a wireless communication standard into a header portion of a frame of each of the plurality of signals, wherein the wireless communication standard prescribes the wireless communication standardized data rate.

4. The method of claim 3, wherein the training sequence comprises at least one of a short training sequence and a long training sequence.

5. The method of claim 3, wherein processing each of the plurality of encoded data comprises:

inserting a signal field compliant with the wireless communication standard into the header portion of the frame of each of the plurality of signals, wherein the signal field frame length and a number of bytes corresponding to one of the wireless communication standardized data rates of the combination of the wireless communication standardized data rates.

6. The method of claim 2, wherein processing each of the plurality of encoded data comprises:

inserting pilot tones compliant with a wireless communication standard into a frame of each of the plurality of signals, wherein the wireless communication standard prescribes the wireless communication standardized data rate.

7. The method of claim 2, wherein each of the plurality of signals comprises a power spectral density and data modulation in accordance with a wireless communication standard that prescribes the wireless communication standardized data rate.

8. The method of claim 1, wherein the wireless communication standardized data rate comprises one or more data rates specified in a wireless communication standard such as IEEE 802.11a, IEEE 802,11b, IEEE 802.11g and other wireless standards.

9. A method for receiving high data rate wireless communication transmissions, the method comprises:

receiving a plurality of radio frequency (RF) signals in accordance with a wireless communication standardized data rate on a plurality of RF channels;

converting each of the plurality of RF signals into a plurality of signals;

for each of the plurality of signals:
removing guard intervals from the plurality of signals to produce time domain symbols;
performing a fast Fourier transform (FFT) on the time domain symbols to produce frequency domain symbols; and
symbol demapping the frequency domain symbols to produce N streams of interleaved data, wherein N corresponds to the integer multiple;

deinterleaving the N streams of interleaved data over N baseband or near-baseband channels and combining, at M-bits per division, the N streams of deinterleaved data to produce high rate encoded data;

decoding the high rate encoded data at a rate corresponding to the combination of the wireless communication standardized data rates to produce the MAC processed data; and processing the MAC data at a combination of wireless communication standardized data rates to produce recovered data.

10. The method of claim 9, wherein the deinterleaving comprises:

individually deinterleaving each of the N streams of interleaved data to produce N streams of deinterleaved data.

11. A transmitter capable of increased data rate wireless communication transmissions, the transmitter comprises:

a media access control (MAC) module operably coupled to process data at a MAC level at a combination of a wireless communication standardized data rates to produce MAC processed data;

an encoder of a baseband processing module operably coupled to encode the MAC processed data at a rate corresponding to the combination of the wireless communication standardized data rates to produce high rate encoded data;

a dividing module of a baseband processing module operably coupled to divide, at M-bits per division, the high rate encoded data into a plurality of encoded data streams, wherein a number of the plurality of encoded data streams is N, where N is an integer greater than one and wherein M is an integer greater than or equal to one;

an interleaving module of the baseband processing module operably coupled to individual Iv interleave each of the plurality of encoded data streams over N baseband or near-baseband channels to produce N streams of interleaved data;

the baseband processing module operably coupled to further process the N streams of interleaved data into a plurality of signals at baseband or near baseband, wherein a number of the plurality of signals multiplies N; and radio frequency transmit module operably coupled to convert each of the plurality of signals into a plurality of radio frequency (RF) signals and operably coupled to transmit the plurality of RF signals in accordance with the wireless communication standardized data rate on a plurality of RF channels.

12. The transmitter of claim 11, wherein the baseband processing module comprises:

a symbol mapping modules operably coupled to symbol map sections of a stream of the N streams of interleaved data to produce symbols;

IFFT modules operably coupled to perform an inverse fast Fourier transform (IFFT) on the symbols to produce time domain symbols; and guard interval module operably coupled to insert guard intervals between the time domain symbols to produce the plurality of signals.

13. The transmitter of claim 12, wherein the baseband processing module further comprises:

training sequence module operably coupled to insert a training sequence compliant with a wireless communication standard into a header portion of a frame of each of the plurality of signals, wherein the wireless communication standard prescribes the wireless communication standardized data rate; wherein the training sequence includes at least one of a short training sequence and a long training sequence.

14. The transmitter of claim 13, wherein the baseband processing module further comprises:

signal field module operably coupled to insert a signal field compliant with the wireless communication standard into the header portion of the frame of each of the plurality of signals, wherein the signal field frame length and a number of bytes corresponding to one of the wireless communication standardized data rates of the combination of the wireless communication standardized data rates.

15. The transmitter of claim 12, wherein the baseband processing module comprises:
- a pilot tone module operably coupled to insert pilot tones compliant with a wireless communication standard into a frame of each of the plurality of signals, wherein the wireless communication standard prescribes the wireless communication standardized data rate.

16. A receiver capable of receiving high data rate wireless communication transmissions, the receiver comprises:
- RF receiving module operably coupled to convert a plurality of radio frequency (RF) signals into a plurality of signals, wherein the plurality of RF signals are received via a plurality of RF channels, wherein each of the plurality of signals has a data rate in accordance with at least one wireless communication standardized data rate;
- guard interval module of a baseband processing module operably coupled to remove guard intervals from each of the plurality of signals to produce time domain symbols;
- FFT module of the baseband processing module operably coupled to perform a fast Fourier transform (FET) on the time domain symbols to produce frequency domain symbols;
- symbol demapping module of the baseband processing module operably coupled to symbol demap the frequency domain symbols to produce N streams of interleaved data, wherein N corresponds to the integer multiple;
- deinterleaving module of the baseband processing module operably coupled to deinterleave the N streams of interleaved data over N baseband or near-baseband channels and to combine, at M-bits per division, the N streams of deinterleaved data to produce high rate encoded data;
- decoding module of the baseband processing module operably coupled to decode the high rate encoded data at a rate corresponding to the combination of the at least one wireless communication standardized data rate to produce the MAC processed data, wherein the guard interval module, the FFT module, the symbol demapping module, the deinterleaving module, and the decoding module process the plurality of signal at or near baseband to produce the MAC processed data; and
- MAC processing module operably coupled to process the MAC data at a combination of the at least one wireless communication standardized data rate to produce recovered data.

17. The receiver of claim 16, wherein the deinterleaving module comprises:
- a plurality of deinterleavers operably coupled to deinterleave the N streams of interleaved data to produce N streams of deinterleaved data.

* * * * *